United States Patent
Patel

(10) Patent No.: US 7,178,594 B2
(45) Date of Patent: Feb. 20, 2007

(54) METHOD FOR USING REVERSIBLE PHASE OIL-BASED DRILLING FLUID

(75) Inventor: Arvind D Patel, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 245 days.

(21) Appl. No.: 10/889,722

(22) Filed: Jul. 13, 2004

(65) Prior Publication Data

US 2004/0259738 A1 Dec. 23, 2004

Related U.S. Application Data

(60) Division of application No. 09/887,138, filed on Jun. 22, 2001, now Pat. No. 6,806,233, which is a continuation-in-part of application No. 09/770,848, filed on Jan. 26, 2001, now Pat. No. 6,790,811, which is a continuation of application No. 08/862,201, filed on May 23, 1997, now Pat. No. 6,218,342.

(60) Provisional application No. 60/023,043, filed on Aug. 2, 1996.

(51) Int. Cl.
*E21B 43/04* (2006.01)

(52) U.S. Cl. ............ 166/278; 166/300; 166/312; 507/129; 507/131; 507/239; 507/244

(58) Field of Classification Search ........... 166/278, 166/300, 312; 507/129, 131, 239, 244
See application file for complete search history.

(56) References Cited

U.S. PATENT DOCUMENTS

| | | | |
|---|---|---|---|
| 2,217,927 A | 10/1940 | Van Campen |
| 2,802,531 A | 8/1957 | Cardwell |
| 2,816,073 A | 12/1957 | Strutton |
| 2,900,336 A | 8/1959 | Brown |
| 2,900,337 A | 8/1959 | Earley |
| 3,125,517 A | 3/1964 | Voda |
| 3,372,112 A | 3/1968 | Parker |
| 3,684,012 A | 8/1972 | Scheffel |
| 3,804,760 A | 4/1974 | Darley |
| 3,878,117 A | 4/1975 | Williams |
| RE028,474 E | 7/1975 | Anderson |
| 3,892,275 A | 7/1975 | Lybarger |
| 3,912,683 A | 10/1975 | O'Farrell |
| 3,954,627 A | 5/1976 | Dreher |
| 3,962,151 A | 6/1976 | Dekker |
| 4,007,149 A | 2/1977 | Burton |
| 4,012,329 A | 3/1977 | Hayes |
| 4,040,866 A | 8/1977 | Mondshine |
| 4,148,821 A | 4/1979 | Nussbaum |
| 4,153,588 A | 5/1979 | Makowski |
| 4,230,586 A | 10/1980 | Bretz |
| 4,390,474 A | 6/1983 | Nussbaum |
| 4,425,462 A | 1/1984 | Turner |
| 4,447,338 A | 5/1984 | Lundberg |
| 4,508,628 A | 4/1985 | Walker |
| 4,552,215 A | 11/1985 | Almond |
| 4,552,670 A | 11/1985 | Lipowski |
| 4,553,601 A | 11/1985 | Almond |
| 4,582,543 A | 4/1986 | Bretz |
| 4,615,813 A | 10/1986 | Bretz |
| 4,645,608 A | 2/1987 | Rayborn |
| 4,662,447 A | 5/1987 | Bolin |
| 4,670,550 A | 6/1987 | Bleeker |
| 4,671,883 A | 6/1987 | Connell |
| 4,725,372 A | 2/1988 | Teot |
| 4,735,731 A | 4/1988 | Rose |
| 4,787,990 A | 11/1988 | Boyd |
| 4,802,998 A | 2/1989 | Mueller |
| 4,810,355 A | 3/1989 | Hopkins |
| 4,828,724 A | 5/1989 | Davidson |
| 4,887,464 A | 12/1989 | Tannenbaum |
| 4,900,456 A | 2/1990 | Ogilvy |
| 4,945,991 A | 8/1990 | Jones |
| 4,964,615 A | 10/1990 | Mueller |
| 5,045,219 A | 9/1991 | Trahan |
| 5,053,534 A | 10/1991 | Cosgrove |
| 5,089,151 A | 2/1992 | Hall |
| 5,096,883 A | 3/1992 | Mercer |
| 5,106,516 A | 4/1992 | Mueller |
| 5,156,686 A | 10/1992 | Van Slyke |
| 5,182,326 A | 1/1993 | LeBlanc |
| 5,189,012 A | 2/1993 | Patel |
| 5,194,640 A | 3/1993 | Cosgrove |
| 5,232,910 A | 8/1993 | Mueller |
| 5,237,080 A | 8/1993 | Daute |
| 5,252,531 A | 10/1993 | Yasuda |
| 5,252,554 A | 10/1993 | Mueller |
| 5,254,531 A | 10/1993 | Mueller |
| 5,260,268 A | 11/1993 | Forsberg |
| 5,308,401 A | 5/1994 | Geke |
| 5,318,954 A | 6/1994 | Mueller |
| 5,318,955 A | 6/1994 | Mueller |
| 5,318,956 A | 6/1994 | Mueller |
| 5,330,662 A | 7/1994 | Jahnke |
| 5,333,698 A | 8/1994 | Van Slyke |

(Continued)

*Primary Examiner*—George Suchfield
(74) *Attorney, Agent, or Firm*—M-I L.L.C.; Carter J. White

(57) ABSTRACT

Invert emulsion compositions including an oleaginous, a non-oleaginous and an amine surfactant that are useful in the oil and gas well drilling art are disclosed. The amine surfactant is selected so that the invert emulsion can be converted form a water-in-oil type emulsion to a oil-in-water type emulsion upon the protonation of the amine surfactant. Deprotonation of the amine surfactant reverses the conversion. This solution also permits the conversion of oil-wet solids in the fluid into water-wet solids.

8 Claims, No Drawings

U.S. PATENT DOCUMENTS

| | | |
|---|---|---|
| 5,363,916 A | 11/1994 | Himes |
| 5,373,899 A | 12/1994 | Dore |
| 5,403,508 A | 4/1995 | Reng |
| 5,403,820 A | 4/1995 | Walker |
| 5,403,822 A | 4/1995 | Mueller |
| 5,432,152 A | 7/1995 | Dawson |
| 5,441,927 A | 8/1995 | Mueller |
| 5,498,596 A | 3/1996 | Ashjian |
| 5,508,258 A | 4/1996 | Mueller |
| 5,551,516 A | 9/1996 | Norman |
| 5,569,642 A | 10/1996 | Lin |
| 5,589,442 A | 12/1996 | Gee |
| 5,593,954 A | 1/1997 | Malchow, Jr. |
| 5,607,901 A | 3/1997 | Toups, Jr. |
| 5,620,946 A | 4/1997 | Jahnke |
| 5,634,984 A | 6/1997 | Van Slyke |
| 5,635,457 A | 6/1997 | Van Slyke |
| 5,710,110 A | 1/1998 | Cooperman |
| 5,744,677 A | 4/1998 | Wu |
| 5,837,655 A | 11/1998 | Halliday |
| 5,846,913 A | 12/1998 | Sawdon |
| 5,849,974 A | 12/1998 | Clarembeau |
| RE036,066 E | 1/1999 | Mueller |
| 5,869,434 A | 2/1999 | Mueller |
| 5,877,378 A | 3/1999 | Overstreet |
| 5,888,944 A | 3/1999 | Patel |
| 5,905,061 A | 5/1999 | Patel |
| 5,909,779 A * | 6/1999 | Patel et al. .................... 175/50 |
| 5,929,297 A | 7/1999 | Theriot |
| 5,958,845 A | 9/1999 | Van Slyke |
| 5,979,557 A | 11/1999 | Card |
| 6,001,790 A | 12/1999 | Schmitt |
| 6,022,833 A | 2/2000 | Mueller |
| 6,029,755 A | 2/2000 | Patel |
| 6,034,037 A | 3/2000 | Van Slyke |
| 6,090,754 A | 7/2000 | Chan |
| 6,107,255 A | 8/2000 | Van Slyke |
| 6,110,874 A | 8/2000 | Van Slyke |
| 6,165,946 A | 12/2000 | Mueller |
| 6,211,119 B1 | 4/2001 | Herold |
| 6,218,342 B1 | 4/2001 | Patel |
| 6,302,209 B1 | 10/2001 | Thompson, Sr. |
| 6,308,788 B1 | 10/2001 | Patel |
| 6,399,546 B1 | 6/2002 | Chang |
| 6,405,809 B2 * | 6/2002 | Patel et al. .................... 175/50 |
| 6,435,277 B1 | 8/2002 | Qu |
| 6,482,866 B1 | 11/2002 | Dahayanake |
| 6,499,546 B1 | 12/2002 | Freeman |
| 6,525,003 B2 | 2/2003 | Schlemmer |
| 6,608,006 B2 | 8/2003 | Taylor |
| 6,620,770 B1 | 9/2003 | Kirsner |
| 6,626,241 B2 | 9/2003 | Nguyen |
| 6,631,764 B2 | 10/2003 | Parlar |
| 6,776,234 B2 | 8/2004 | Boudreau |
| 6,787,505 B1 | 9/2004 | Maitland |
| 6,790,811 B2 | 9/2004 | Patel |
| 6,806,233 B2 * | 10/2004 | Patel .................... 507/129 |
| 6,830,104 B2 | 12/2004 | Nguyen |
| 6,883,608 B2 * | 4/2005 | Parlar et al. ................ 166/278 |
| 6,935,426 B1 | 8/2005 | Rainbolt |
| 6,939,832 B2 | 9/2005 | Collins |
| 6,989,354 B2 | 1/2006 | Thaemlitz |
| 7,008,907 B2 | 3/2006 | Kirsner |
| 2003/0045605 A1 * | 3/2003 | Thompson .................. 523/130 |

* cited by examiner

METHOD FOR USING REVERSIBLE PHASE OIL-BASED DRILLING FLUID

This application is a division of U.S. patent application Ser. No. 09/887,138, filed Jun. 22, 2001, now U.S. Pat. No. 6,806,233 which is a continuation-in-part of U.S. patent application Ser. No. 09/770,848, filed Jan. 26, 2001, now U.S. Pat. No. 6,790,811 which is a continuation of U.S. patent application Ser. No. 08/862,201 filed May 23, 1997, now U.S. Pat. No. 6,218,342 which is a non-provisional that claims the benefit of Provisional Application No. 60/023,043 filed Aug. 2, 1996, such applications are hereby incorporated herein by reference.

BACKGROUND OF THE INVENTION

Many types of fluids have been used in the drilling of oil and gas wells. The selection of an oil-based drilling fluid, also known as oil-based mud, involves a careful balance of the both the good and bad characteristics of such fluids in a particular application, the type of well to be drilled and the characteristics of the oil or gas field in which the well is to be drilled. A surfactant capable of emulsifying incorporated water into the oil is an essential component of oil-based muds.

The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art.

An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil based mud can be justified.

Despite the many benefits of utilizing oil-based muds, they have disadvantages. In general the use of oil based drilling fluids and muds has high initial and operational costs. These costs can be significant depending on the depth of the hole to be drilled. However, often the higher costs can be justified if the oil based drilling fluid prevents the caving in or hole enlargement which can greatly increase drilling time and costs. Disposal of oil-coated cuttings is another primary concern, especially for off-shore or deep-water drilling operations. In these latter cases, the cuttings must be either washed clean of the oil with a detergent solution which also must be disposed of, or the cuttings must be shipped back to shore for disposal in an environmentally safe manner. Another consideration that must be taken into account is the local governmental regulations that may restrict the use of oil based drilling fluids and muds for environmental reasons.

Oil-based muds contain some water, either formed in the formulation of the drilling fluid itself, or residual water in the hole, or intentionally added water to affect the properties of the drilling fluid or mud. In such water-in-oil type emulsions, also know as invert emulsions, a emulsifier is utilized that will stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of skill in the art. The use of traditional emulsifiers and surfactants in invert drilling fluid systems can complicate the clean up process in open hole completion operations. Fluids using traditional surfactant and emulsifier materials may require the use of solvents and other surfactant washes to penetrate the filter cake and reverse the wetability of the filter cake particles. That is to say the washing with detergents should convert the oil-wet solids of the filter cake into water-wet solids. Water-wet solids in the filter cake are necessary so that the subsequent acid wash can attack the particles of the mud cake and destroy or remove them prior to production. The productivity of a well is somewhat dependent on effectively and efficiently removing the filter cake while minimizing the potential of water blocking, plugging or otherwise damaging the natural flow channels of the formation. The problems of efficient well clean-up, stimulation, and completion are a significant issue in all wells, and especially in open-hole horizontal well completions.

A typical horizontal well completion process includes one or more of the following: drilling the horizontal section utilizing an oil-based drilling fluid; smoothing directional corrections with a hole opener; displacing the open hole section with an unused drill-in fluid to minimize solids exposed to the completion assembly; running the completion assembly in to the horizontal well; displacing the drill-in fluid with a completion brine; washing the filter cake with solvents and surfactants to remove or wash away the oil-based drilling fluid; destroying the filter cake with an acid soak; and, commencing production. Extension of the time required to clean up the open hole well can result in wellbore instability and possible collapse. The collapse of a well is generally considered a bad occurrence because the well will then have to be redrilled or opened up if production from the formation is to occur. Thus the stability of the open-hole well limits the number of steps performed before commencing production. Thus there is a tradeoff between increased production due to a fully cleaned-up well bore and the potential of well collapse due to instability.

In view of the above there exists an unmet need for an oil-based drilling fluid or mud emulsion that can easily be broken in the presence of the acid soak solution. Such a fluid would allow a decrease in the number of steps involved in removing the filter cake and cleaning up the well which minimizes the risk of well collapse. In addition such a fluid would allow for a more thorough and complete cleaning up of the well thus increasing the production of the well.

SUMMARY OF THE INVENTION

Surprisingly, a novel invert emulsion fluid useful in the drilling, completing or working over of a subterranean well has been invented in which the emulsion can be readily and reversibly converted from a water-in-oil type emulsion to a oil-in water type emulsion. In one particular embodiment, the invert emulsion fluid includes an oleaginous fluid, a non-oleaginous fluid and an amine surfactant having the structure

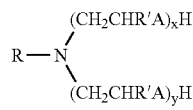

wherein R is a $C_{12}$ to $C_{22}$ group, R' is independently selected from H, or $C_1$ to $C_3$ alkyl; A is NH or O and the sum of x and y is greater or equal to one but less than or equal to three. The oleaginous fluid may preferably be diesel oil, mineral oil, a synthetic oil and suitable combinations of these and may include at least 5% of a material selected form the group including esters, ethers, acetals, dialkylcarbonates, hydrocarbons and combinations thereof. The non-oleaginous fluid is preferably an aqueous liquid which may be selected from the group including sea water, brine containing organic and/or inorganic dissolved salts, an aqueous solution containing water-miscible organic compounds, or combinations of these. In another embodiment of the present invention, the invert emulsion fluid may contain a weighting agent, a bridging agent or both. Such weighting agents and/or bridging agents may be selected from the group including calcium carbonate, dolomite, siderite, barite, celestite, iron oxides, manganese oxides, ulexite, carnalite, and sodium chloride.

Another embodiment of the present invention includes the method of converting the emulsion of the present invention from an invert emulsion to a regular emulsion. In this embodiment, the invert emulsion is admixed with an acid that is functionally able to protonate the amine surfactant. When sufficient quantities of the acid are utilized, the invert emulsion of the present invention is converted so that the oleaginous fluid becomes the discontinuous phase and the non-oleaginous fluid becomes the continuous phase. The conversion of the phases is reversible so that upon addition of a base capable of deprotonating the protonated amine surfactant, a stable invert emulsion in which the oleaginous liquid becomes the continuous phase and the non-oleaginous fluid become the discontinuous phase can be formed.

DESCRIPTION OF ILLUSTRATIVE EMBODIMENTS

The interfacial tension between an oleaginous fluid, for example oil, and a non-oleaginous fluid, for example water, is often high. Thus, if the liquids are mixed together they spontaneously separate from each other when the agitation ceases, to minimize the interfacial area. Lowering the interfacial tension with a emulsifier enables one liquid to form a stable dispersion of fine droplets in the other. The lower the interfacial tension, the smaller the droplets and the more stable the emulsion. In most emulsions, the oleaginous fluid is the dispersed phase and the non-oleaginous fluid is the continuous phase. However, "invert emulsions" in which the non-oleaginous fluid is the dispersed phase and the oleaginous fluid is the continuous phase, can be formed upon the use of a suitable emulsifier. One of skill in the art should appreciate that the chemical properties of the emulsifier are important in the selection of a suitable emulsifier to form a stable invert emulsion.

The present invention is generally directed to an invert emulsion fluid that is useful in the drilling, completing and working over of subterranean wells, preferably oil and gas wells. Such uses of invert emulsion fluids in such application should be known to one of skill in the art as is noted in the book *COMPOSITION AND PROPERTIES OF DRILLING AND COMPLETION FLUIDS*, 5th Edition, H. C. H. Darley and George R. Gray, Gulf Publishing Company, 1988, the contents of which are hereby incorporated herein by reference.

In one embodiment of the present invention, the invert emulsion fluid includes an oleaginous fluid, an non-oleaginous fluid and an amine surfactant. The surfactant component is selected so as to provide the unexpected and unobvious results substantially described herein. When a majority of the amine is in its unprotonated form, an invert emulsion may be formed in which the oleaginous liquid is the continuous phase and the non-oleaginous liquid is the discontinuous phase. That is to say, the unprotonated form of the amine surfactant is able to stabilize an invert emulsion. Upon addition of a protonating agent, herein referred to as an acid, that is capable of protonating a major portion of the amine surfactant, the oleaginous liquid becomes the discontinuous phase and the non-oleaginous liquid become the continuous phase. In other words, the invert emulsion is converted to a regular emulsion upon the addition of acid and the protonation of the amine surfactant. Further, upon addition of a deprotonanting agent, herein referred to as a base, that is capable of deprotonating a major portion of the protonated amine surfactant, an invert emulsion may be again formed; that is, the invert emulsion of the present invention is reversible to an oil-in-water emulsion, and back.

The oleaginous fluid of the present invention is a liquid and more preferably is a natural or synthetic oil and more preferably the oleaginous fluid is selected from the group including diesel oil; mineral oil; a synthetic oil, such as polyolefins, polydiorganosiloxanes, siloxanes or organosiloxanes; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid of the present invention is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

The selection of a suitable amine surfactant useful in the present invention is accomplished by combining an amount of the unprotonated amine with portions of the oleaginous fluid and non-oleaginous fluid in a suitable container. The fluid is then vigorously agitated or sheared so as to intimately mix the two fluids. Upon stopping of the mixing, visual observation will determine if an emulsion has formed. An emulsion is considered stable if the oleaginous and the non-oleaginous fluids do not substantially separate after agitation. That is to say the emulsion will last for more than about 1 minute after the halting of the agitating or shearing motion that formed the emulsion. One test of whether or not an invert emulsion has formed is to take a small portion of the emulsion and place it in a container of the oleaginous fluid. If an invert emulsion is formed, the drop of emulsion will disperse in the oleaginous fluid. An alternative test is to measure the electrical stability of the resulting emulsion using an commonly available emulsion stability tester. Generally in such tests, the voltage applied across two electrodes is increased until the emulsion breaks and a surge of current flows between the two electrodes. The voltage required to break the emulsion is regarded in the art as a measure of the stability of the emulsion. Such tests of emulsion stability should be well known to one of skill in the art as is evidenced by described on page 166 of the book *COMPOSITION AND PROPERTIES OF DRILLING AND COMPLETION FLUIDS, 5th Edition*, H. C. H. Darley and George R. Gray, Gulf Publishing Company, 1988, the contents of which are hereby incorporated herein by reference.

In view of the above selection criteria, in one embodiment of the present invention the amine surfactant should have the general formula

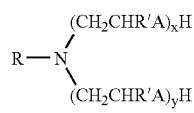

wherein R is $C_{12}$–$C_{22}$; R' is independently selected from hydrogen or $C_1$ to $C_3$ alkyl group; A is NH or O, and x+y has a value greater than or equal to one but also less than or equal to three. Preferably the R group may be a $C_{12}$–$C_{22}$ aliphatic hydrocarbon and more preferably is a non-cyclic aliphatic. In one embodiment the R group contains at least one degree of unsaturation that is to say at least one carbon-carbon double bond. In another embodiment the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In another embodiment, one in which the A group is NH, the value of x+y is preferably two with x having a preferred value of one. In yet another embodiment in which the A group is O, the preferred value of x+y is two with the value of x being preferably one. Preferred examples of commercially available amine surfactants include Ethomeen T/12 a diethoxylated tallow amine; Ethomeen S/12 a diethoxylated soya amine; Duomeen O a N-oleyl-1,3-diaminopropane, Duomeen T a N-tallow-1,3-diaminopropane, all of which are available from Akzo.

The amount of amine surfactant present in the invert emulsion fluid of the present invention, as noted above, should be sufficient to stabilize the invert emulsion according to the above noted test. That is to say the emulsion will last for more than about 1 minute after the halting of the agitation or shearing motion that forms the emulsion. While the concentration may vary depending on the particular components in the drilling fluid or mud, typically the concentration is less than about 10% by volume of the fluid. Thus in one embodiment the amine surfactant is preferably present in the invert emulsion fluid at a concentration of 0.1% to 5.0%. More preferably the amount of amine surfactant present should be present in a concentration of 1 to 5% by volume of the fluid.

As previously noted above, it has been unexpectedly found that the addition of a protonating agent causes the conversion of the invert emulsion, that is to say a water-in-oil type emulsion, into a regular or conventional emulsion, that is to say an oil-in-water type emulsion. The protonating agent, herein referred to as an "acid", must be functionally capable of protonating the amine surfactant. Further, the acid should be of sufficient strength to protonate the amine surfactant so as to cause the conversion of the emulsion from an invert emulsion to a regular emulsion. In one embodiment this amount is greater than about 1 equivalent of acid and preferably is about 0.1 to about 5 equivalents. Compounds that are suitable for use as an acid include, mineral acids and organic acids preferably soluble in water. Preferred mineral acids include hydrochloric acid, sulfuric acid, nitric acid, phosphoric acid, hydrofluoric acid, hydrobromic acid and the like. Preferred organic acids include citric acid, tartaric acid, acetic acid, propionic acid, glycolic acid, lactic acid, halogenated acetic acids, butyric acid, organosulfonic acids, organophosphoric acids, and the like. Compounds that generate acid upon dissolution in water may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and similar such compounds. Typically, fatty acids should be avoided or used in small amounts so as to not interfere with the reversibility of the amine surfactant system.

In yet another embodiment of the present invention, other surfactant compounds may be used in conjunction with the amine surfactants utilized herein. In such cases it is important however that the quantity and nature of these supplemental surfactants not interfere in the ability and properties given the emulsion fluid by the amine surfactant to act as described herein.

The method used in preparing the drilling fluids of the present invention is not critical. Conventional methods can be used to prepare the drilling fluids of the present invention in a manner analogous to those normally used, to prepare conventional oil-based drilling fluids. In one representative procedure, a desired quantity of oleaginous fluid such as a base oil and a suitable amount of amine emulsifier are mixed together and the remaining components are added sequentially with continuous mixing. An invert emulsion of the present invention is formed by vigorously agitating, mixing or shearing the oleaginous fluid and the non-oleaginous fluid.

The fluids of the present invention may further contain additional chemicals depending upon the end use of the invert emulsion so long as they do not interfere with the reversibility of the invert emulsion fluids described herein. For example, wetting agents, organophilic clays, viscosifiers, weighting agents, bridging agents and fluid loss control agents may be added to the fluid compositions of this invention for additional functional properties. The addition of such agents should be well known to one of skill in the art of formulating drilling fluids and muds. However, it should be noted that the addition of such agents should not adversely interfere with the properties imparted by the amine surfactant as described herein.

Wetting agents that may be suitable for use in this invention include, crude tall oil, oxidized crude tall oil, surfactants, organic phosphate esters, modified imidazolines and amidoamines, alkyl aromatic sulfates and sulfonates, and the like, and combinations or derivatives of these. However, the use of fatty acid wetting agents should be minimized so as to not adversely effect the reversibility of the invert emulsion disclosed herein. Versawet® and Versawet®NS are examples of commercially available wetting agents manufactured and distributed by M-I Drilling Fluids L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight range are sufficient for most applications. VG-69 and VG-PLUS are organoclay materials distributed by M-I Drilling Fluids L.L.C., and Versa-HRP is a polyamide resin material manufactured and distributed by M-I Drilling Fluids L.L.C., that may be used in this invention.

Suspending agents suitable for use in this invention include organophilic clays, amine treated clays, oil soluble polymers, polyamide resins, polycarboxylic acids, and soaps. The amount of viscosifier used in the composition, if any, may vary depending upon the end use of the composition. However, normally about 0.1% to about 6% by weight is sufficient for most applications. VG-69 and VG-PLUS are organoclay materials distributed by M-I Drilling Fluids L.L.C., and Versa-HRP is a polyamide resin material manufactured and distributed by M-I Drilling Fluids L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

Because many of properties of the invert emulsion of the present invention are similar to those of conventional invert emulsions, the application of the fluids should be straightforward.

One unexpected and unobvious aspect of drilling subterranean wells with the invert emulsion of the present invention is that well clean-up and well stimulation are much easier and quicker to carry out, especially when the well penetrates or comes into contact with a producing formation. As described above, when a conventional invert emulsion drilling fluid is used, cleaning up and stimulating the well may include washing the filter cake with detergents and an acid wash to dissolve the filter cake particles. If these operations are to be fully effective, a significant amount of aqueous detergent and aqueous acid may penetrate the formation resulting in water blockages in the formation which adversely affect production.

In addition, time is of the essence when open hole operations such as logging are being conducted because the hole can collapse unexpectedly. Thus, in one embodiment of the present invention is a method of logging a well using conventional well logging tools by first drilling the well with the invert emulsion, reversing the invert emulsion to a regular emulsion, logging the well and then reversing back the regular emulsion fluid to an invert emulsion so that drilling operation can resume. When the fluid comes into contact with a producing formation a filter cake is formed in a conventional manner. However, instead of washing the hole with a detergent solution prior to acid washing, the use of the drilling fluid of the present invention allows for the use of only an acid containing washing solution. Thus, the acid in the acid washing solution, the acid being functionally able to protonate the amine surfactant, is injected into the well so as to convert the emulsion on the filter cake which initially is a water-in-oil type emulsion, into an oil-in-water type emulsion. The acid protonates the amine and the previously oil-wet particles of the filter cake thereby become water-wet allowing the acid to readily reach and dissolve the acid soluble solids in the filter cake. Thus the removal of the oil based filter cake is easier and the process of cleaning-up or stimulating the well is able to be done more effectively and rapidly.

Another unexpected and advantageous benefit of the present invention is the ability to effectively wash drill cuttings of the oil based drilling fluid. As noted above, this is conventionally done with strong detergent solutions that do not allow for the recovery and reuse of the drilling oil. In fact seemingly "oil-free" cuttings can contain up to 30% oil absorbed to the particle surface of the cuttings. The present invention allows for the replacement of some or all of the detergent solutions with an acid containing solution as a washing fluid for the cuttings. In such an embodiment, the well would be drilled using the drilling fluids and muds described herein. The resulting cuttings would be separated from the fluid using conventional solids removal methods. The cuttings would then be contacted at least once with an acid solution so as to invert the emulsion coating the cuttings. That is to say the washing with acid causes the cuttings to convert from being oil-wet to water-wet solids allowing the substantial removal of the oleaginous liquid from the cuttings. Once substantially free of oleaginous liquid, the cuttings may be further processed or disposed of by reinjection. With the fluids of the present invention, it is possible to recover the oleaginous fluid from the acid wash. In such an embodiment the spent acid wash fluid is admixed with a base solution, thus deprotonating the amine surfactant. This facilitates the recovery of the amine surfactant and the oleaginous fluid which may then be reused in the drilling operation. One of skill in the art should appreciate the benefits of such a system in that the oleaginous fluid is substantially removed from the cuttings and the oleaginous fluid can be recovered for reuse in the drilling operation. Further one of skill in the art should appreciate that reinjection of the cuttings will be much easier when the cuttings are water wet as a result of the acid wash solution.

Another embodiment of the present invention is a method for the recovery and recycling of the oleaginous fluid in a used oil based drilling fluid. In such a method, the invert emulsion fluids as described herein are used as the drilling, completing, or workover fluid in a well. The used invert emulsion fluid is admixed with an acid, the acid being functionally able to protonate the amine surfactant and being in sufficient quantities so as to convert the invert emulsion to a regular emulsion. That is to say, the addition of the acid protonates the amine surfactant and the water-in-oil type emulsion utilized in drilling the well is converted into a oil-in-water type emulsion. Solids, now substantially water-wet, may now be separated from the fluid by gravity or mechanical means for further processing or disposal. The fluid may then be mixed with a base, the base being functionally able to deprotonate the protonated amine surfactant. The base should be in sufficient quantities so as to convert the oil-in-water type emulsion formed upon the addition of acid, back to a water-in-oil emulsion. The resulting water-in-oil emulsion may then be used as it is or reformulated into a drilling fluid suitable for the drilling conditions in another well.

The fluids of the present invention may also be utilized in well activities other than simply drilling the well. For example the fluids of the present invention can be used in the electrical logging, gravel packing, formation fracturing, well completion, well reworking and other similar type operations where it would be advantageous. Such uses are contemplated and thus considered within the scope of the present invention. In carrying out such operations, one of skill in the art should appreciate the specific details involved in each operation.

Thus, one illustrative embodiment of the present invention includes a method of electrically logging a subterranean well. Such an illustrative method includes drilling the subterranean well with an invert emulsion drilling fluid. The invert emulsion should be formulated in accordance with the present invention. That is to say, the fluid includes: an oleaginous fluid; a non-oleaginous fluid; and an amine surfactant having the structure

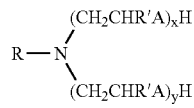

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$. In carrying out the illustrative method acid is added to the invert emulsion drilling fluid in a sufficient amount to reverse the filtercake solids from being oil-wet to being water-wet. The well is then electrically logged. In one preferred embodiment of such a method, the oleaginous fluid includes from 5 to about 100% by volume of the oleaginous fluid of a material selected from a group consisting of esters, ethers, acetals, di-alkylcarbonates, hydrocarbons, and combinations of these and similar such compounds useful as the continuous phase in an invert emulsion. It is also preferred that the non-oleaginous liquid is an aqueous liquid and more preferably the aqueous liquid is selected from the group consisting of sea water, a brine containing organic or inorganic dissolved salts, a liquid containing water-miscible organic compounds, and combinations thereof. In one preferred embodiment of the present illustrative method, the amine surfactant is selected from diethoxylated tallow amine; diethoxylated soya amine; N-aliphatic-1,3-diaminopropane wherein the aliphatic group is a $C_{12}$ to $C_{22}$ hydrocarbon; or combinations of these.

The fluids of the present invention can also be utilized in the reinjection disposal of drill cuttings. Generally the method of disposing of drill cuttings by injection includes the separation of the drill cuttings from the drilling fluid, grinding or slurrification of the drill cuttings in a liquid medium and then injection of the slurry into a subterranean formation that is the target of the disposal operation. The methods and techniques of such disposal processes should be well known to one of skill in the art. The following U.S patents are representative of the methods and other potential uses for the fluids of the present invention: U.S. Pat. Nos. 4,942,929; 5,129,469; 5,226,749; 5,3102,85; 5,314,265; 5,405,224; 5,589,603; 5,961,438; 5,339,912; 5,358,049; 5,405,223; 5,589,603; 5,662,169; and 6,106,733; and 6,119,779, all of the contents of each of these patents being incorporated by reference into the present disclosure. In such an illustrative method drill cuttings are collected, ground into a slurry and injected into a downhole area of a subterranean well. As contemplated with the fluids of the present invention, such an illustrative method includes: collecting the drilling cuttings from a subterranean well drilled with an invert emulsion drilling fluid. This can be carried out in a conventional manner using cuttings separators and shakers. The invert emulsion drilling fluid used to drill the well includes: an oleaginous fluid; a non-oleaginous fluid; an amine surfactant having the structure

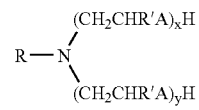

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$. The illustrative method also includes adding acid to said drilling cuttings so as to change the drilling cuttings from being oil wet to being water wet and grinding and suspending said cuttings in an aqueous based injection fluid. This slurry or suspension of cuttings in injecting fluid is injected into a disposal zone in a subterranean well.

Another illustrative embodiment of the present invention includes a method of gravel packing a downhole area of a subterranean well using the fluids of the present invention as the carrier fluid for the gravel packing material. In one illustrative embodiment of such a method, a mixture of a gravel packing material and an invert emulsion drilling fluid is formed. The invert emulsion fluid is used as the carrier fluid that is to say the fluid that carries the solid gravel packing materials downhole. As noted above the fluids of the present invention are formulated such that they include: an oleaginous fluid; a non-oleaginous fluid; an amine surfactant having the structure

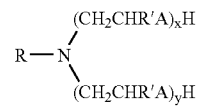

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$;

Upon formation of the mixture, the mixture is injected into a subterranean well so as to gravel pack the downhole area. Such packing is preferably done in slug fashion. The invert emulsion can then be converted to a regular emulsion by adding acid to the fluid so as to change the invert emulsion drilling fluid into a regular emulsion. When this occurs, this also converts the oil-wet gravel solids into water-wet solids. After converting the invert emulsion into a regular emulsion, the gravel pack can be washed to remove any fine particles that would other clog the pore of the gravel pack. Preferably such washing is carried out with an aqueous based wash solution.

The present invention also encompasses a method of fracturing a subterranean formation, in which the subterranean formation is in fluid communication with the surface via a well. Such an illustrative embodiment includes: injecting a fracturing fluid into said well; pressurizing said fluid so as to cause the subterranean formation to fracture and allow the propant materials to enter said fracture; adding acid to said fluid so as to change the oil-wet propant materials into water-wet propant materials and; washing said well with an aqueous based wash solution. the fracturing fluid of such an illustrative embodiment includes: an oleaginous fluid; and an amine surfactant having the structure

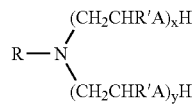

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$; and oil-wet propant material.

One specific embodiment of the present illustrative embodiment includes an oleaginous fluid comprising from 5 to about 100% by volume of the oleaginous fluid of a material selected from a group consisting of esters, ethers, acetals, di-alkylcarbonates, hydrocarbons, and combinations thereof. In another illustrative embodiment, the fracturing fluid further includes a non-oleaginous liquid, preferably the non-oleaginous liquid is selected from sea water, a brine containing organic or inorganic dissolved salts, a liquid containing water-miscible organic compounds, and combinations thereof. It is preferred that the amine surfactant is selected from diethoxylated tallow amine; diethoxylated soya amine; N-aliphatic-1,3-diaminopropane wherein the aliphatic group is a $C_{12}$ to $C_{22}$ hydrocarbon; or combinations of these compounds. It is also preferred that the propant material is selected from quartz gravel, sand, glass beads, ceramic pellets, and combinations of these and similar propant materials known in the art.

The following examples are included to demonstrate preferred embodiments of the invention and to illustrate the fluid formulations of the present invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

General Information Relevant to the Examples

These tests were conducted in accordance with the procedures in API Bulletin RP 13B-2, 1990. The following abbreviations are sometimes used in describing the results of experimentation.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss, measured in milliliters (ml) according to API bulletin RP 13 B-2, 1990.

EXAMPLE-1

Invert-drilling fluids are prepared according to the following formulations with an oleaginous fluid to non-oleaginous fluid-ratio of 70/30. All the materials are in grams.

Formulations

| Material | Mud 1 | Mud 2 | Mud 3 |
|---|---|---|---|
| I.O. $C_{16}$–$C_{18}$ | 125.2 | 125.2 | 125.2 |
| Lime | 2.0 | 2.0 | 2.0 |
| VG-PLUS | 2.0 | 2.0 | 2.0 |
| NOVAMUL | 10.0 | — | — |
| Emphos PS-2227 | — | 5.0 | — |
| Ethomeen T/12 | — | — | 10.0 |
| 25% CaCl$_2$ Brine | 90 | 90 | 90 |
| CaCO$_3$ | 293 | 293 | 293 |

In the above table, I.O. $C_{16}$–$C_{18}$ is an isomerized olefin available from Amoco; VG-PLUS is an organophilic clay available from MI Drilling Fluids; NOVAMUL is a amidoamine surfactant available from M. I. Drilling Fluids; Emphos PS 2227 is a phosphate ester surfactant available from Witco Chemicals; Ethomeen T/12 is a ethoxylated tallow amine available from Akzo Chemicals; and all other components are technical grade chemicals commonly available.

The following general procedure was used in mixing the mud formulations: First the oil (IO-$C_{16}$–$C_{18}$), lime and organophilic clay were mixed for 15 min. on a Hamilton Beach Mixer in a suitable mixing jar. Emulsifier was added and the combination was further mixed for 10 min. The calcium-chloride brine was then added and mixed for 15 min. The weight material (CaCO$_3$) was added and then jar contents were mixed for 20 min. The initial and heat aged fluid properties were measured at the indicated temperatures.

The following rheologies were measured at room temperature after the above formulated fluids were heat aged at 150° F. for 16 hours:

| | Mud 1 | Mud 2 | Mud 3 |
|---|---|---|---|
| Plastic Viscosity (PV) | 44 | 36 | 41 |
| Yield Point (YP) | 13 | 4 | 28 |
| Gel Strength | | | |
| 10 sec. | 6 | 3 | 8 |
| 10 min. | 8 | 5 | 12 |
| Electrical Stability (E.S.) | 516 | 303 | 244 |

The above fluids were further heat aged at 250° F. for 16 hours. Upon cooling, the fluids were mixed for 15 min. and the following rheological properties were measured at room temperature:

|  | Mud-1 | Mud-2 | Mud-3 |
|---|---|---|---|
| Plastic Viscosity (PV) | 49 | 45 | 51 |
| Yield Point (YP) | 32 | 4 | 39 |
| Gels |  |  |  |
| 10 sec. | 15 | 2 | 16 |
| 10 min. | 15 | 3 | 21 |
| Electrical Stability (E.S.) | 552 | 205 | 322 |

Upon review of the above results, one of skill in the art should understand that stable drilling fluid formulations can be prepared utilizing amine emulsifiers of the present invention.

Each mud formulation was treated with 10.0 ml of 17.5% hydrochloric acid solution and stirred for an additional 10 min. Mud 1 and mud 2 remained invert oil-base muds as indicated by measured electrical stabilities of 453 and 359 respectively. However, mud 3 formulated in accordance with this invention, was converted so that the non-oleaginous fluid, in this case brine, became the continuous phase and the oleaginous fluid became the internal phase. As a result the mud became thick. The water-continuous phase was indicated by a measured electrical stability of seven and the fluid was dispersible in water.

One of ordinary skill in the art should understand and appreciate that the above results indicate that conventional emulsifiers can not be readily converted to water-base mud upon the addition of acid. However, the amine emulsifier of this invention upon protonation, can result in the conversion of a water-in-oil type emulsion to an oil-in-water type emulsion.

The hydrochloric acid treated mud 3 was then treated with 5.0 g lime (Ca(OH)$_2$) and stirred for 15 min. The following rheological properties were obtained after treatment with lime.

| P.V. | 53 |
|---|---|
| Y.P. | 7 |
| Gels |  |
| 10 Sec. | 2 |
| 10 Min. | 3 |
| E.S. | 609 |

In view of the above results, one of skill in the art should realize that upon deprotonation of amine-surfactant of this invention the fluid can be converted back from oil-in-water type emulsion to water-in-oil type emulsion.

EXAMPLE-2

The following invert-drilling fluids were prepared according to the following formulations with an oleaginous fluid to non-oleaginous fluid ratio of 50/50.

| Material | Formulations |  |  |  |  |
|---|---|---|---|---|---|
|  | Mud 4 | Mud 5 | Mud 6 | Mud 7 | Mud 8 |
| IO-C$_{16}$–C$_{18}$ | 121 | 121 | 121 | 121 | 121 |
| Lime | 1.0 | 1.0 | 1.0 | 1.0 | 1.0 |
| VG-PLUS | 2.0 | 2.0 | 2.0 | 2.0 | 2.0 |
| Surfactant (grams) | Ethomeen T/12 (12.0) | Ethomeen S/12 (12.0) | Duomeen O (12.0) | Duomeen T (12.0) | NOVAMUL (12.0) |
| 25% CaCl$_2$ Brine | 200 | 200 | 200 | 200 | 200 |
| Calcium Carbonate | 61 | 61 | 61 | — | — |
| Barite | — | — | — | 66 | 66 |

In the above table the terms and abbreviations are the same as in Example 1. In addition the terms Ethomeen S/12 is an ethoxylated soya amine available from Akzo Duomeen O is a N-oleyl-1,3-diaminopropane available from Akzo Chemical; Duomeen T is a N-tallow-1,3-diaminopropane available from Akzo; and all other components are technical grade chemicals commonly available.

The above mud formulation were mixed according to the general procedure described previously in Example 1. The following initial properties were measured at room temperature.

|  | Mud 4 | Mud 5 | Mud 6 | Mud 7 | Mud 8 |
|---|---|---|---|---|---|
| P.V. | 43 | 42 | 32 | 35 | 42 |
| Y.P. | 12 | 19 | 4 | 9 | 21 |
| Gels |  |  |  |  |  |
| 10 Sec. | 5 | 6 | 2 | 5 | 8 |
| 10 Min. | 7 | 8 | 3 | 6 | 10 |
| E.S. | 880 | 496 | 727 | 452 | 150 |

The above muds were heat aged at 150° F. for 16 hours. The following rheological properties were then measured at room temperature.

|  | Mud 4 | Mud 5 | Mud 6 | Mud 7 | Mud 8 |
|---|---|---|---|---|---|
| P.V. | 43 | 44 | 30 | 36 | 35 |
| Y.P. | 13 | 15 | 9 | 10 | 15 |
| Gels |  |  |  |  |  |
| 10 Sec. | 6 | 6 | 3 | 5 | 6 |
| 10 Min. | 7 | 7 | 4 | 7 | 10 |
| E.S. | 552 | 268 | 450 | 392 | 223 |

In view of the above data, one of skill in the art would recognize that stable invert emulsion muds can be prepared utilizing various emulsifiers including those of this invention.

The above heat aged muds 4–8 were treated with 15 ml. of 17.5% hydrochloric acid solution. After mixing for 10 min. the following data were obtained.

|        | Mud 4 | Mud 5 | Mud 6 | Mud 7 | Mud 8 |
|--------|-------|-------|-------|-------|-------|
| P.V.   | 22    | 27    | 31    | to    | 30    |
| Y.P.   | 1     | 1     | 9     | thick | 8     |
| Gels   |       |       |       |       |       |
| 10 Sec.| 2     | 1     | 9     | water-wet | 3 |
| 10 Min.| 2     | 1     | 8     | Barite | 2 |
| E.S.   | 5     | 7     | 6     | 6     | 216   |
| Comments | Water-wet | Water-wet | Water-wet | Water-wet | Oil-wet |

In view of the above data, one of skill in the art would realize the following: mud formulations 4–7 with amine surfactant of the present invention converted to oil-in-water type emulsions when treated with acid; mud formulation 8, which is representative of a conventional drilling fluid remained a water-in-oil type emulsion. These conclusions are supported by reviewing the electrical stability data in which the single digit values of mud formulations 4–7 indicate a water continuous phase. In contrast, the electrical stability data of mud formulation 8 having a value of 216 indicates that the oil remains the continuous phase.

Treatment of formulations 4–7 each with 5.0 grams of lime and stirring for 10 min. converted back to water-in-oil type emulsions. The following are the electrical stability and rheological data of formulations 4–7 after such treatment:

|        | Mud 4 | Mud 5 | Mud 6 | Mud 7 |
|--------|-------|-------|-------|-------|
| ES.    | 585   | 523   | 123   | 352   |
| P.V.   | 65    | 59    | —     | 35    |
| Y.P.   | 24    | 16    | —     | 16    |
| Gels   |       |       |       |       |
| 10 Sec.| 5     | 4     | —     | 6     |
| 10 Min.| 7     | 5     | —     | 9     |

One of skill in the art, upon review of the above data should appreciate that upon protonation of amine surfactants of this invention the water-in-oil type emulsion fluids can be converted to oil-in-water type emulsions. In addition, upon deprotonation of the protonated amine surfactants the oil-in-water type emulsions can be reconverted into water-in-oil type emulsions.

EXAMPLE-3

The following demonstrate the utility of amine emulsifiers of this invention in combination with other emulsifiers.

Formulations

| Material | Mud 9 | Mud 10 | Mud 11 | Mud 12 |
|----------|-------|--------|--------|--------|
| IO-$C_{16}$–$C_{18}$ | 125 | 125 | 125 | 125 |
| Lime | 2 | 2 | 2 | 2 |
| Organoclay | 4 | 4 | 4 | 4 |
| Ethomeen T/12 | 10 | 10 | 8 | 6 |
| Wetting Agent | Emphos PS2227 1.5 | VERSAWET 1.5 | NOVAMUL-3, NOVAWET-1 1.5 | Monamide - 150ADY 4 |
| Brine 25% $CaCl_2$ | 90 | 90 | 90 | 90 |
| $CaCO_3$ | 291 | 291 | 291 | 291 |

In the above table the terms and abbreviations are the same as in previous examples. In addition, the terms VERSAWET is a oxidized crude tall oil available from MI Drilling; NOVAWET is a wetting agent available from MI Drilling; Monamide-150ADY is available from Mona Chemicals; and all other components are technical grade chemicals commonly available.

Mud formulations 9–12 were prepared in a manner described above in Example 1.

After recording the initial electrical stability of mud formulations 9–12, the muds were heat aged at 250° F./16 hours. The following results were obtained on these mud formulations:

|               | Mud 9 | Mud 10 | Mud 11 | Mud 12 |
|---------------|-------|--------|--------|--------|
| Initial E.S.  | 396   | 377    | 368    | 277    |
| Heat Aged E.S.| 525   | 375    | 310    | 350    |
| P.V.          | 66    | 57     | 55     | 62     |
| Y.P.          | 8     | 15     | 16     | 9      |
| Gels          |       |        |        |        |
| 10 Sec.       | 6     | 7      | 6      | 7      |
| 10 Min.       | 6     | 8      | 7      | 7      |

To a 35 ml portion of the above mud formulations 9–12, 2.0 ml of glacial acetic acid was added to protonate T/12 amine surfactant. The acetic acid treated samples were thick and converted rapidly to oil-in-water type emulsions. The electrical stability values for each of the acid treated samples were six or lower. One of skill in the art will appreciate that such low electrical stability indicates that the water is the continuous phase, that is to say a oil-in-water emulsion formed. In addition, the acid treated mud formulations 9–12 were water-dispersible.

The remaining portion of mud formulations 9–12 were contaminated with 25 ppb Rev-Dust a simulated drilled solids material, and further heat aged at 250° F./16 hours.

The following heat aged properties were measured on these samples:

|  | Mud 9 | Mud 10 | Mud 11 | Mud 12 |
|---|---|---|---|---|
| E.S. | 426 | 486 | 400 | 687 |
| P.V. | 85 | 88 | 76 | 84 |
| Y.P. | 17 | 20 | 19 | 6 |
| Gels |  |  |  |  |
| 10 Sec. | 6 | 8 | 8 | 7 |
| 10 Min. | 7 | 12 | 11 | 9 |
| High Temp High Pressure Fluid Loss at 200° F. | 7.0 | 6.0 | 4.4 | 4.0 |

The above heat-aged and Rev-Dust contaminated samples were further contaminated with 17.5 ml of sea-water, mixed for 30 min. and heat aged at 250° F./16 hours.

The following rheological properties were measured for the resulting samples:

|  | Mud 9 | Mud 10 | Mud 11 | Mud 12 |
|---|---|---|---|---|
| E.S. | 980 | 2000+ | 2000+ | 780 |
| P.V. | 100 | 107 | 93 | 83 |
| Y.P. | 29 | 32 | 36 | 18 |
| Gels |  |  |  |  |
| 10 Sec. | 11 | 12 | 11 | 9 |
| 10 Min. | 20 | 17 | 14 | 10 |

To the resulting muds, 50% by volume of water and 10 g of glacial acetic acid were added and the mixture stirred for 10 min. The electrical stability value for each sample was six or less. In addition the muds were dispersible in water indicating that water was continuous phase.

Given the above results, one of skill in the art should realize that invert emulsion drilling fluids can be prepared utilizing the amine surfactants of this invention in combination with other conventional surfactants. In addition, these fluids can tolerate the addition of common contaminants and can still be converted from water-in-oil type emulsions to oil-in-water type emulsions upon protonating the amine surfactants.

EXAMPLE-4

The following mud formulations were prepared to demonstrate the use of different oleaginous materials using the amine surfactants of the present invention.

Formulations

| Material | Mud 13 | Mud 14 | Mud 15 | Mud 16 |
|---|---|---|---|---|
| Oil | LVT-200 | dioctyl carbonate | Diesel | Sarapar-147 |
| (gm) | (120) | (120) | (120) | (120) |
| Lime | 1.0 | 1.0 | — | 1.0 |
| VG-PLUS | 2.0 | 2.0 | 2.0 | 2.0 |
| Ethomeen T/12 | 12 | 12 | 12 | 12 |
| 25% CaCl$_2$ Brine | 190 | 190 | 190 | 190 |
| CaCO$_3$ | 66 | 66 | 66 | 66 |

In the above table the terms and abbreviations are the same as in previous examples. In addition the terms, LVT-200 is a mineral oil available from CONOCO Oil Co. dioctyl carbonate is available from Huntsman Chemical; Sarapar-147 is a paraffin hydrocarbon available from Shell Oil Company (Singapore); and all other components are technical grade chemicals commonly available.

The above muds were made in accordance with the procedure given above in Example 1.

The following initial rheologies were measured at 120° F.

|  | Mud 13 | Mud 14 | Mud 15 | Mud 16 |
|---|---|---|---|---|
| E.S. | 229 | 512 | 239 | 313 |
| P.V. | 21 | 53 | 41 | 34 |
| Y.P. | 16 | 124 | 31 | 7 |
| Gels |  |  |  |  |
| 10 Sec. | 8 | 60 | 13 | 4 |
| 10 Min. | 8 | 61 | 17 | 5 |

The above mud formulations were heat aged at 150° F./16 hours. The following rheologies were measured at 120° F.

|  | Mud 13 | Mud 14 | Mud 15 | Mud 16 |
|---|---|---|---|---|
| E.S. | 279 | 35 | 299 | 245 |
| P.V. | 27 | thick | 45 | 29 |
| Y.P. | 10 |  | 32 | 8 |
| Gels |  |  |  |  |
| 10 Sec. | 6 |  | 15 | 6 |
| 10 Min. | 7 |  | 17 | 7 |

The above mud formulations were treated with 10 ml of 17.5% hydrochloric acid solutions. The electrical stability of each formulation dropped to six and became water dispersible. One of skill in the art would readily appreciate that this information indicated that the initial water-in-oil type emulsion formed was converted to an oil-in-water type emulsion upon the protonation of the amine surfactant.

Upon treating with 4.0 ml of 50% sodium hydroxide or 5.0 g of lime, the above acid treated mud formulations converted back from being oil-in-water type emulsions to water-in-oil type emulsions. The electrical stability of these alkali treated muds were as follow:

|  | Mud 13 | Mud 15 | Mud 16 |
|---|---|---|---|
| E.S. | 552 | 543 | 512 |

Upon treatment with either hydrochloric-acid, acetic acid or lactic acid, the fluids converted to oil-in-water type emulsions with electrical stability of six. Treating the acid treated emulsions with 4.0 ml of 50% sodium hydroxide, converted the oil-in-water type emulsion into a water-in-oil type emulsion with E.S. of 500, or greater.

One of skill in the art should appreciate that the above results indicate that various types of oleaginous materials can be used to formulate invert emulsion fluids of the present invention. In addition, these invert emulsions can be converted to regular emulsions and back to invert emulsions by protonating and deprotonating the amine using various water-soluble acids and base.

EXAMPLE-5

To demonstrate the utility of various acids in protonating the amine-surfactant of this invention the following formulations were prepared.

| Formulations | | |
| --- | --- | --- |
| Material | Mud 17 | Mud 18 |
| Sarapar-147 | 120 | 120 |
| Lime | 1 | 1 |
| VG-PLUS | 2.0 | 2.0 |
| Ethomeen-T/12 | 120. | 120. |
| 25% CaCl$_2$ Brine | 190 | 190 |
| Emphos-PS-2227 | 0.8 | — |
| VERSAWET | — | 2.20 |
| Barite | 66. | 66. |

In the above table the terms and abbreviations are the same as in previous examples.

The above muds were made in accordance with the procedure given above in Example 1.

The above formulations were heat aged at 150° F./16 hours. The following rheologies were measured at room temperature:

| | Mud 17 | Mud 18 |
| --- | --- | --- |
| E.S. | 380 | 470 |
| PV | 26 | 26 |
| YP | 12 | 9 |
| Gels | | |
| 10 sec. | 6 | 5 |
| 1-Min. | 6 | 6 |

The above mud formulations were further heat aged at 250° F. for 16 hours. The following is the rheologic properties at room temperature:

| | Mud 17 | Mud 18 |
| --- | --- | --- |
| E.S. | 606 | 750 |
| PV | 33 | 30 |
| YP | 9 | 11 |
| Gels | | |
| 10 Sec. | 4 | 4 |
| 10 Min. | 5 | 5 |

Mud 17 was treated with 6 g. of solid citric acid. After 1.5 hours of mixing the electrical stability was measured and had a value of six. One of skill in the art should readily appreciate that such a low electrical stability value indicated that the previously formed water-in-oil type emulsion mud was converted to a oil-in-water type emulsion mud upon the addition of the citric acid.

Mud 18 was treated with 6.0 g. of glycolic acid. After a thorough mixing the electrical stability was measured and had a value of six. One of skill in the art should readily appreciate that such a low electrical stability value indicated that the previously formed water-in-oil type emulsion mud was converted to a oil-in-water type emulsion mud upon the addition of the glycolic acid.

Upon treatment with 5.0 g. lime or 4.0 ml of 50% NaOH both the formulations converted back to water-in-oil type emulsions each having an electrical stability of 608 and 808 respectively.

EXAMPLE-6

The following formulation was prepared to demonstrate the utility of amine emulsifiers of this invention in making higher mud weight formulations using barite.

Formulations

| Material | Mud 19 |
| --- | --- |
| IO-C$_{16}$-C$_{18}$ | 147.6 |
| Lime | 2.0 |
| VG-PLUS | 4.0 |
| Ethomeen-T/12 | 10 |
| Emphos PS-2227 | 1.5 |
| CaCl$_2$ Brine 25% | 106 |
| Barite | 276 |

In the above table the terms and abbreviations are the same as in previous examples.

The mud formulation was prepared in a manner described above in Example 1.

The following rheologies were measured at room temperature before and after heat aging at 150° F. for 16 hours.

| | Initial | Heat Aged |
| --- | --- | --- |
| E.S. | 632 | 525 |
| P.V. | 40 | 45 |
| Y.P. | 6 | 7 |
| Gels | | |
| 10 Sec. | 5 | 5 |
| 10 Min. | 6 | 7 |

Upon treating the above formulations with 10 ml 17.5% hydrochloric acid the electrical stability dropped to 6. The mud was too thick to measure the rheological characteristics. The heat aged mud was found to be water-dispersible. One of skill in the art should readily appreciate that such a low electrical stability value and the water-dispersible characteristic of the heat aged mud indicate that the previously formed water-in-oil type emulsion mud was converted to an oil-in-water type emulsion mud upon the addition of the acid.

Treatment of the mud/acid mixture with 5.0 g. lime converted the oil-in-water type emulsion back to a water-in-oil type emulsion as evidenced by the measurement of an electrical stability of 189.

EXAMPLE-7

The following formulations were prepared to demonstrate the utilization of fatty acid ester and dialkylcarbonate as oleaginous material in preparing the mud formulations of this invention.

Formulations

| Material | Mud 20 | Mud 21 |
| --- | --- | --- |
| Fina Green | 188 | — |
| Mixed dialkyl carbonate | — | 188 |
| Lime | 1.0 | 1.0 |
| Organophilic Clay | 2.0 | 2.0 |
| T/12 | 12.0 | 12.0 |
| 25% CaCl$_2$ Brine | 98 | 98 |
| CaCO$_3$ | 76 | 76 |

In the above table the terms and abbreviations are the same as in previous examples. In addition the terms, Fina Green is a fatty acid ester available from Fina Petroleum Corp.; Mixed dialkylcarbonate is a mixture of aliphatic dialkyl carbonates available from Enichem Chemicals; and all other components are technical grade chemicals commonly available.

The mud formulations were prepared in a manner described above in Example 1.

The above formulations, mud 20 and mud 21 were heat aged at 150° F. for 16 hours. The heat aged rheologies were measured at 100° F.

|  | Mud 20 | Mud 21 |
|---|---|---|
| E.S. | 884 | 645 |
| P.V. | 89 | 53 |
| Y.P. | 37 | 18 |
| Gels |  |  |
| 10 Sec. | 22 | 10 |
| 10 Min. | 27 | 14 |

The above mud formulations when treated with 10 ml of 17.5% hydrochloric acid, electrical stability values dropped to 18. Both mud formulation were water dispersible. One of skill in the art should readily appreciate that such a low electrical stability value and the water-dispersible characteristic of the heat aged mud indicate that the previously formed water-in-oil type emulsion mud was converted to an oil-in-water type emulsion mud upon the addition of the acid.

Upon treatment with 5.0 g. of lime both mud formulation became water-in-oil type emulsions as evidenced by the oil dispersible character of the emulsions and electrical stability values of 485. One of skill in the art should appreciate that the above demonstrates that the water-in-oil emulsion character of the originally formulated invert emulsion was restored by the addition of the lime which deprotonated the amine surfactant.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A method of gravel packing a downhole area of a subterranean well, said method comprising:
   a) forming a mixture of a gravel packing material and an invert emulsion drilling fluid, wherein said fluid includes: an oleaginous fluid; a non-oleaginous fluid; an amine surfactant having the structure

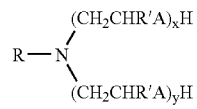

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$;
   b) injecting said mixture of gravel packing material and invert emulsion into a subterranean well so as to gravel pack the downhole area; and
   c) adding acid to said invert emulsion drilling fluid so as to change the oil-wet gravel packing materials into water-wet gravel packing materials and;
   d) washing said well with an aqueous based wash solution.

2. The method of claim 1 wherein said oleaginous fluid comprising from 5 to about 100% by volume of the oleaginous fluid of a material selected from a group consisting of esters, ethers, acetals, di-alkylcarbonates, hydrocarbons, and combinations thereof.

3. The method of claim 1 wherein said non-oleaginous liquid is an aqueous liquid.

4. The method of claim 3 wherein said aqueous liquid is selected from the group consisting of sea water, a brine containing organic or inorganic dissolved salts, a liquid containing water-miscible organic compounds, and combinations thereof.

5. The method of claim 1 wherein said amine surfactant is selected from diethoxylated tallow amine; diethoxylated soya amine; N-aliphatic-1,3-diaminopropane wherein the aliphatic group is a $C_{12}$ to $C_{22}$ hydrocarbon; or combinations thereof.

6. A method of gravel packing a downhole area of a subterranean well, said method comprising:
   a) forming a mixture of a gravel packing material and an invert emulsion drilling fluid, wherein said fluid includes: an oleaginous fluid; a non-oleaginous fluid; an amine surfactant having the structure

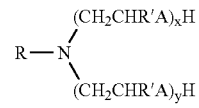

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$;
   b) injecting said mixture of gravel packing material and invert emulsion into a subterranean well so as to gravel pack the downhole area; and
   c) acidifying said invert emulsion drilling fluid so as to change the oil-wet gravel packing materials into water-wet gravel packing materials and;
   d) washing said well with an aqueous based wash solution.

7. The method of claim 6 wherein said fluid is acidified by carbon dioxide from the formation.

8. The method of claim 6 wherein said fluid is acidified by hydrogen sulfide from the formation.

* * * * *